United States Patent [19]

Lipschutz

[11] 4,096,715
[45] Jun. 27, 1978

[54] ANTI-THEFT DEVICE FOR A MOTORCYCLE HELMET

[75] Inventor: Paul Lipschutz, Croissy, France

[73] Assignee: Neiman S.A., Courbevoie, France

[21] Appl. No.: 774,300

[22] Filed: Mar. 4, 1977

[30] Foreign Application Priority Data

Mar. 31, 1976 France .................. 76 09261

[51] Int. Cl.² .................................. E05B 69/00
[52] U.S. Cl. ............................... 70/59; 70/19
[58] Field of Search ............. 70/258, 233, 19, 58

[56] References Cited

U.S. PATENT DOCUMENTS

| 1,021,343 | 3/1912 | Tingley | 70/19 |
|---|---|---|---|
| 1,361,264 | 12/1920 | Kaercher | 70/15 |
| 1,819,813 | 8/1931 | Ellenberger | 70/19 |
| 3,581,531 | 6/1971 | Hediger | 70/59 |
| 3,896,643 | 7/1975 | Kawokami | 70/59 |
| 3,953,990 | 5/1976 | Nagel | 70/19 |

FOREIGN PATENT DOCUMENTS 73,498   3/1915   Austria .................. 70/19

Primary Examiner—Richard E. Moore
Attorney, Agent, or Firm—Nolte & Nolte

[57] ABSTRACT

An anti-theft device for a motorcycle helmet. Said helmet has a continuous rib on the periphery of the edge of its opening. There is provided means for gripping said edge of the opening of the helmet behind said rib, and a lock device for locking said gripping means in the gripping position.

10 Claims, 6 Drawing Figures

ANTI-THEFT DEVICE FOR A MOTORCYCLE HELMET

The invention relates to an anti-theft device for a motorcycle helmet.

In order to prevent the theft of a helmet it must be rendered unitary by means of a lockable device with a fixed part, such as a post or a fence or the motorcycle if the latter is itself provided with an anti-theft device. This connection is an extremely delicate question, since regulations at present in force prohibit the modification of the structure of the helmet, for example by drilling or the mounting of additional means.

It has been proposed for this purpose to provide a cradle matching the shape of the helmet and equipped with a lock to which there may be fixed one end of a chain the other end of which is connected to the cradle so as to render the helmet unitary with the cradle and the chain, which latter is previously passed around a fixed element or the frame of the motorcycle. This cradle is however very bulky when the motorcyclist uses his helmet so that this device has a limited development.

An object of the invention is to provide a detachable device which may be secured to a helmet without modification of the latter and is small in size and reliable in operation.

According to the invention, there is provided an anti-theft device for a motorcycle helmet, said helmet having a continuous rib on the periphery of the edge of its opening, wherein there is provided means for gripping said edge of the opening of the helmet behind said rib, and a lock device for locking said means in the pinching position.

The use of gripping means cooperating with the rib possessed by most helmets avoids any transformation of the helmet so that regulations at present in force are respected. The device according to the invention may have a very small size.

In a preferred embodiment, said gripping means is connected to one end of a fixing chain. Preferably, the other end of said chain is connected to the motorcycle.

In one embodiment, the gripping means comprises two branches mounted to pivot about a pin remote from the ends of said branches, two confronting ends of said branches having cooperative nose portions constituting a tongs, and a bolt member actuated by a lock device integral with one of said branches, said bolt member being capable of occupying a first position in which it does not prevent the opening of said tongs and a second position in which it prevents the opening of said tongs.

In a modification, said gripping means comprises two jaws which are movable in translation with respect to each other and elastically biased apart, a screw cooperating with a tapped aperture of one of the jaws and extending through the other jaw, a cap pivotally mounted on the head of the screw and carrying a lock device barrel provided with an eccentric pin, said pin being cooperative, for one angular position of the barrel, with a recess formed in said head and, for another angular position of the barrel, disposed outside said recess. The screw head may thus be rendered integral with the cap for clamping or releasing the gripping means. In the opposite case, the cap turns freely with respect to the screw head which cannot be turned for clamping or releasing the gripping means.

The invention will be understood from the ensuing description with reference to the accompanying drawings in which.

Figure 1:
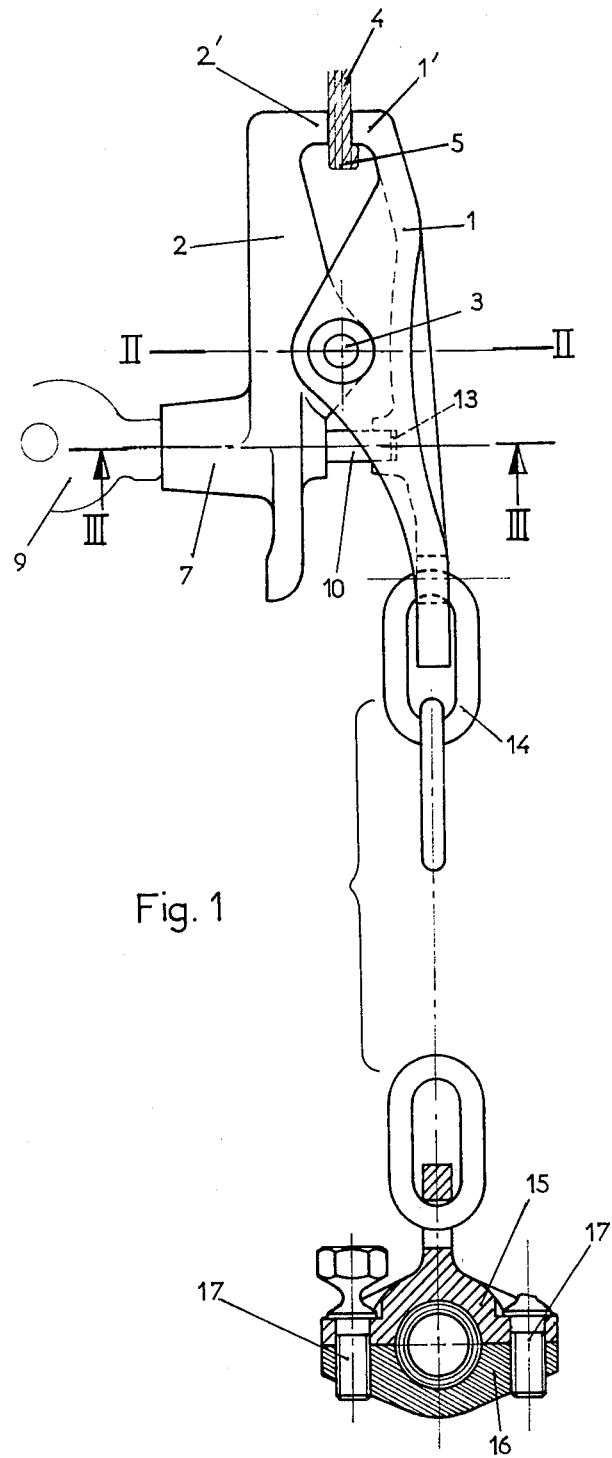
FIG. 1 is an elevational view of an anti-theft device according to one embodiment of the invention.
Figure 2:
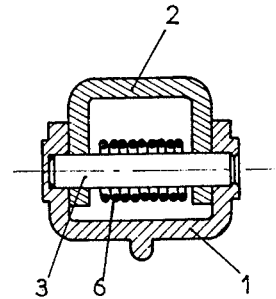
FIG. 2 is a sectional view taken on line II—II of FIG. 1.
Figure 3:
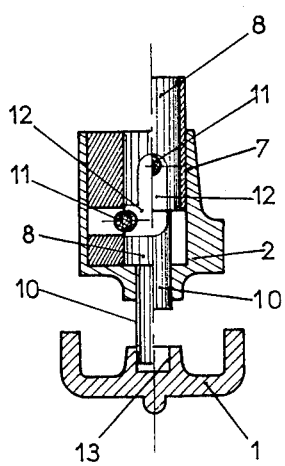
FIG. 3 is a sectional view, partly in elevation, taken on line III—III of FIG. 1, the left half representing the device in the locking position and the right half in the unlocking position.

Reference will first be made to FIGS. 1 to 3. In the illustrated embodiment, the anti-theft device according to the invention comprises two branches 1 and 2 of tongs which are mounted to pivot about a pin 3 and have end nose portions 1' and 2' respectively in facing relation and adapted to grip a helmet 4 behind an edge rib 5 on the helmet. A torsion spring 6, mounted around the pin 3, acts on the branches 1 and 2 in such manner as to bias the nose portions 1' and 2' toward each other.

The branch 2 has in the portion thereof opposed to the nose portion 2' with respect to the pin 3, a cavity 7 for a lock device 8 actuated by a key 9. The lock device 8 is extended axially by a stud 10 (FIG. 3) and is capable of occupying two axial positions owing to the action of a pin 11 which cooperates with a guide groove 12. In the locking position (FIG. 1 and the left side of FIG. 3), the stud 10 projects, whereas in the unlocking position (right side of FIG. 3) the stud 10 is withdrawn. The stud 10 cooperates in the locking position with a blind aperture 13 formed in the branch 1 so that in this position the stud 10 constitutes a stop and precludes the opening of the tongs formed by the nose portions 1' and 2'.

A chain 14 is secured to one end of the branch 1 and, at the other end of the chain, to a semi-collar 15 which can be united with another semi-collar 16 by screws 17 which have heads which are capable of being broken off after the mounting of the collar 15-16 on a part of the motorcycle, such as the handlebars or frame.

Figure 5:
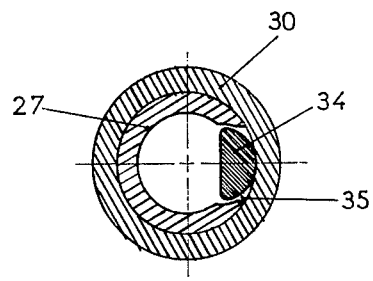
FIG. 5 is a sectional view taken on line V—V of FIG. 4.
Figure 6:
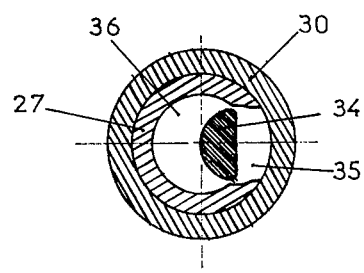
FIG. 6 is similar to FIG. 5, the anti-theft device being in the unlocking position.
Figure 4:
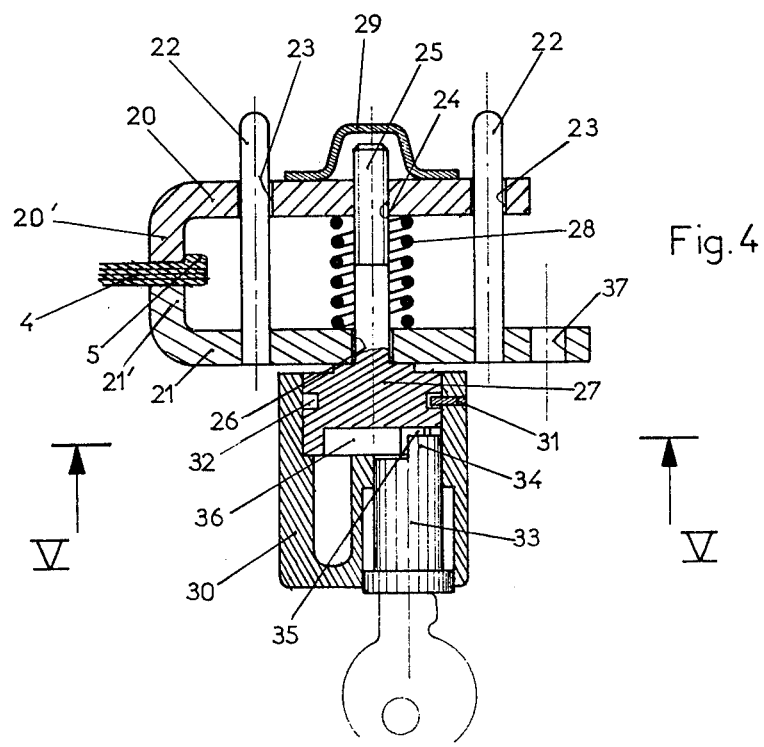
FIG. 4 is a sectional view, with a part cut away, of an anti-theft device according to a modification of the invention in the locking position.

Reference will now be made to FIGS. 4 to 6. In this embodiment, the anti-theft device comprises two jaws 20 and 21, the jaw 21 carrying rods 22 which cooperate with apertures 23 in the jaw 20 so as to ensure a relative guiding of the jaws 20 and 21 in translation. The jaws 20 and 21 have nose portions 20' and 21' which respectively cooperate with the helmet 4 and its rib 5 in the same way as in the foregoing embodiment.

The jaw 20 has a tapped aperture 24 with which the screwthread of a screw 25 cooperates, this screwthread having preferably a rapid pitch, the body of the screw extending through an aperture 26 in the jaw 21 and the head 27 of the screw abutting against the jaw 21. A spring 28 biases the jaws 20 and 21 away from each other and a cover 29 welded on the jaw 20 prevents access to the screw 25.

A cap 30 surrounds the screw head 27 and a pin 31 of this cap cooperates with a groove 32 in the head 27 so that the cap 30 is free to rotate with respect to the head 27 but is prevented from moving in translation relative to the latter.

The cap 30 carries a lock device barrel 33 which is extended by an eccentric stud 34. In the locking position, the stud 34 (FIGS. 4 and 5) is disposed in a slot 35 formed in the head 27 in the radial extension of a blind aperture 36. This stud renders the barrel 33 integral with the screw head 27. An action on the cap 30 therefore screws or unscrews the screw 25 and consequently moves the jaws 20 and 21 toward or away from each other.

On the other hand, in the unlocked position (FIG. 6), the stud 34 is wholly in the aperture 36 and outside the slot 35. The cap 30 is no longer connected to rotate with the screw head 27 and the screw 25 cannot be unscrewed (or screwed).

As in the foregoing embodiment, a chain (not shown) can be secured to the jaw 21 which has an aperture 37 for this purpose.

What is claimed is:

1. An anti-theft device for a motorcycle helmet, said helmet having a continuous rib on the periphery of the edge of its opening, wherein there is provided means for gripping said edge of the opening of the helmet behind said rib, and a lock device for locking said gripping means in the gripping position, wherein said gripping means comprises two branches mounted to pivot about a pin remote from the ends of said branches, two confronting ends of said branches having cooperative nose portions forming a tongs, and a bolt member actuated by a lock device integral with one of said branches, said bolt member being capable of occupying a first position in which it does not prevent the opening of said tongs and a second position in which it prevents the opening of said tongs, said lock device and the bolt member being connected to each other to move in translation.

2. An anti-theft device for a motorcycle helmet, said helmet having a continuous rib on the periphery of the edge of its opening, wherein there is provided means for gripping said edge of the opening of the helmet behind said rib, and a lock device for locking said gripping means in the gripping position, wherein said gripping means comprises two branches mounted to pivot about a pin remote from the ends of said branches, two confronting ends of said branches having cooperative nose portions forming a tongs, and a bolt member actuated by a lock device integral with one of said branches, said bolt member being capable of occupying a first position in which it does not prevent the opening of said tongs and a second position in which it prevents the opening of said tongs, and wherein a torsion spring acts on the branches to urge the nose portions towards each other.

3. An anti-theft device for a motorcycle helmet, said helmet having a continuous rib on the periphery of the edge of its opening, wherein there is provided means for gripping said edge of the opening of the helmet behind said rib, and a lock device for locking said gripping means in the gripping position, wherein said gripping means comprises two branches mounted to pivot about a pin remote from the ends of said branches, two confronting ends of said branches having cooperative nose portions forming a tongs, and a bolt member actuated by a lock device integral with on of said branches, said bolt member being capable of occupying a first position in which it does not prevent the opening of said tongs and a second position in which it prevents the opening of said tongs, and wherein said gripping means comprises two jaws which are relatively movable in translation and elastically biased away from each other, a screw cooperative with a tapped aperture in one of the jaws and extending through the other jaw, a cap pivotally mounted on the head of the screw and carrying a lock device barrel provided with an eccentric stud, said stud being cooperative, in one angular position of the barrel, with a slot formed in said head and, in another angular position of the barrel, being disposed outside said slot.

4. A device as claimed in claim 3, wherein the screw has a rapid pitch.

5. A device as claimed in claim 1, wherein said gripping means is connected to one end of a fixing chain.

6. A device as claimed in claim 5, wherein the other end of said chain is fixed to the motorcycle.

7. A device as claimed in claim 2, wherein said gripping means is connected to one end of a fixing chain.

8. A device as claimed in claim 7 wherein the other end of said chain is fixed to the motorcycle.

9. A device as claimed in claim 3 wherein said gripping means is connected to one end of a fixing chain.

10. A device as claimed in claim 9 wherein the other end of said chain is fixed to the motorcycle.

* * * * *